United States Patent
Kotikov et al.

(10) Patent No.: US 12,073,086 B2
(45) Date of Patent: Aug. 27, 2024

(54) THROTTLING ALGORITHM FOR BLOCK REFRESHING IN DATA STORAGE DEVICE

(71) Applicant: SK hynix Inc., Icheon-si (KR)

(72) Inventors: Aleksandr Kotikov, Minsk (BY); Aliaksandr Zapatylak, Minsk (BY); Dmitri Zeleniak, Minsk (BY); Leanid Kavaliou, Minsk (BY)

(73) Assignee: SK HYNIX INC., Icheon-si (KR)

( * ) Notice: Subject to any disclaimer, the term of this patent is extended or adjusted under 35 U.S.C. 154(b) by 98 days.

(21) Appl. No.: 17/989,592

(22) Filed: Nov. 17, 2022

(65) Prior Publication Data
US 2024/0168638 A1 May 23, 2024

(51) Int. Cl.
*G06F 3/06* (2006.01)

(52) U.S. Cl.
CPC ............ *G06F 3/0613* (2013.01); *G06F 3/064* (2013.01); *G06F 3/0659* (2013.01); *G06F 3/0679* (2013.01)

(58) Field of Classification Search
CPC ...... G06F 3/0613; G06F 3/064; G06F 3/0659; G06F 3/0679
See application file for complete search history.

(56) References Cited

U.S. PATENT DOCUMENTS

| | | | |
|---|---|---|---|
| 6,147,921 A * | 11/2000 | Novak | G11C 11/406 365/236 |
| 8,863,148 B1 | 10/2014 | Chow et al. | |
| 11,314,636 B1 | 4/2022 | Kuzmin et al. | |
| 2014/0281201 A1 * | 9/2014 | Shimizu | G11C 11/40618 711/106 |
| 2021/0312976 A1 * | 10/2021 | Pellizzer | G11C 11/40615 |
| 2022/0044744 A1 * | 2/2022 | Wang | G11C 16/08 |

* cited by examiner

*Primary Examiner* — Francisco A Grullon
(74) *Attorney, Agent, or Firm* — Perkins Coie LLP

(57) ABSTRACT

Disclosed is a memory block refreshing method. The method includes storing a read command in a first register to queue read refresh operations in a case that the read command causes a read counter value to reach a read refresher threshold value, the read counter value indicating a number of read operations performed, adjusting the read refresher threshold value based on a number of first memory blocks corresponding to the queued read refresh operations to obtain a new read refresher threshold value, and performing a mover read operation for moving data from the first memory blocks to second memory blocks different from the first memory blocks upon determination that the read counter value has reached the new read refresher threshold value.

15 Claims, 8 Drawing Sheets

US 12,073,086 B2

THROTTLING ALGORITHM FOR BLOCK REFRESHING IN DATA STORAGE DEVICE

TECHNICAL FIELD

This patent document relates to semiconductor memories and data storages including the semiconductor memories.

BACKGROUND

Semiconductor-based data storage devices such as solid state drives (SSDs) are actively being used in computing systems, due to their improved performance and decreased mechanical reliability compared to hard disk drives (HDDs). A data storage device includes a controller and other hardware components in communication with the computing system via an interface protocol, and data storage elements in the SSD are connected to the controller and hardware components via a device interface. In addition, a variety of software components, operating systems, and firmware may be integrated into the data storage device.

SUMMARY

Embodiments of the disclosed technology relate to methods and systems that, among other features and benefits, adjust a value of the read refresher threshold (RRT) according to a number of blocks that are already in a read refresher queue (RRQ) and adjust the speed of a block moving process.

In an embodiment of the disclosed technology, a method includes storing a read command in a first register to queue read refresh operations in a case that the read command causes a read counter value to reach a read refresher threshold value, the read counter value indicating a number of read operations performed, adjusting the read refresher threshold value based on a number of first memory blocks corresponding to the queued read refresh operations to obtain a new read refresher threshold value, and performing a mover read operation for moving data from the first memory blocks to second memory blocks different from the first memory blocks upon determination that the read counter value has reached the new read refresher threshold value.

In another embodiment of the disclosed technology, a method includes changing a read refresher threshold value from a first value to a second value based on a number of first memory blocks corresponding to read refresh operations queued in a first register, wherein the read refresh operations move data from the first memory blocks to second memory blocks upon receipt of a read command that causes a read counter value, indicative of a number of read operations performed, to reach the second read refresher threshold value, and performing a mover throttling operation to adjust a speed of a mover read operation for the read refresh operations to maintain a first proportion between mover read commands for performing the mover read operation and host read commands for reading data from the first memory blocks by a host.

In another embodiment of the disclosed technology, a system includes a first register configured to store mover read commands for moving data from a first memory block to a second memory block different from the first memory block, a read refresher threshold adjuster in communication with the first register and configured to adjust a read refresher threshold value from a first value to a second value and queue read refresh operations in the first register in a case that a read counter value indicating a number of read operations performed reaches the second read refresher threshold value, and a mover throttling circuit coupled between the first memory block and the second memory block to move data from the first memory block to the second memory block based on the mover read commands stored in the first register.

DETAILED DESCRIPTION

Figure 1:
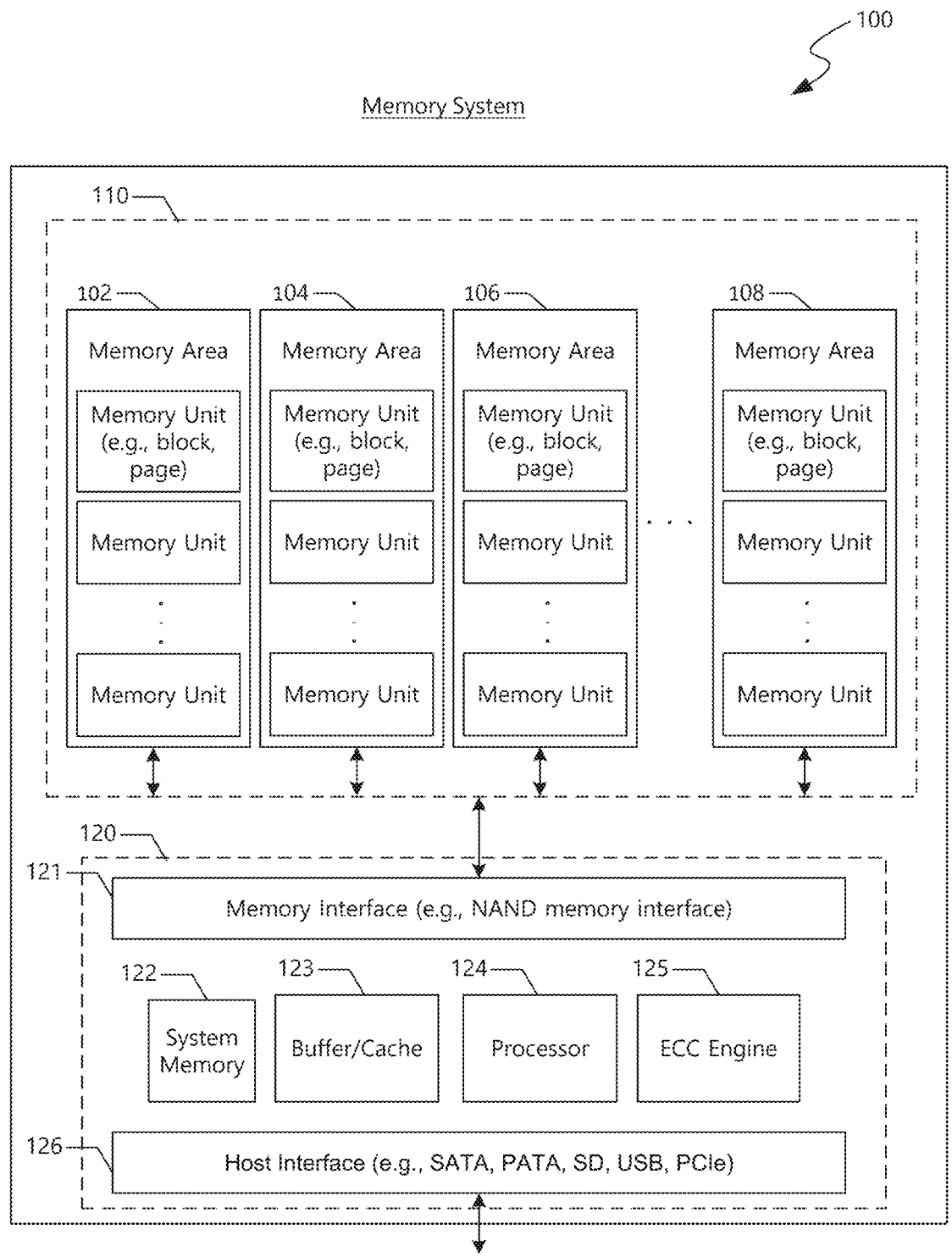
FIG. 1 illustrates an example of a memory system implemented based on some embodiments of the disclosed technology.

FIG. 1 illustrates an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, or 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a bank, block, or page that can be identified by a unique address such as bank address, block address, and page basis address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 111 can be configured to store at least one bit of information (e.g., one bit of information or multiple bits of information), and each of the memory cells in memory area 112 can be configured to store more than one bit of information.

As shown in FIG. 1, the memory system 100 includes a controller module 120. The controller module 120 includes a memory interface 121 to communicate with the memory module 110, a host interface 126 with communicate with a host (not shown), a processor 124 to executes firmware-level code, and caches and memories 122 and 123 to temporarily or persistently store executable firmware/instructions and associated information. In some implementations, the controller unit 120 can include an error correction engine 125 to perform error correction operation on information stored in the memory module 110. Error correction engine 122 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
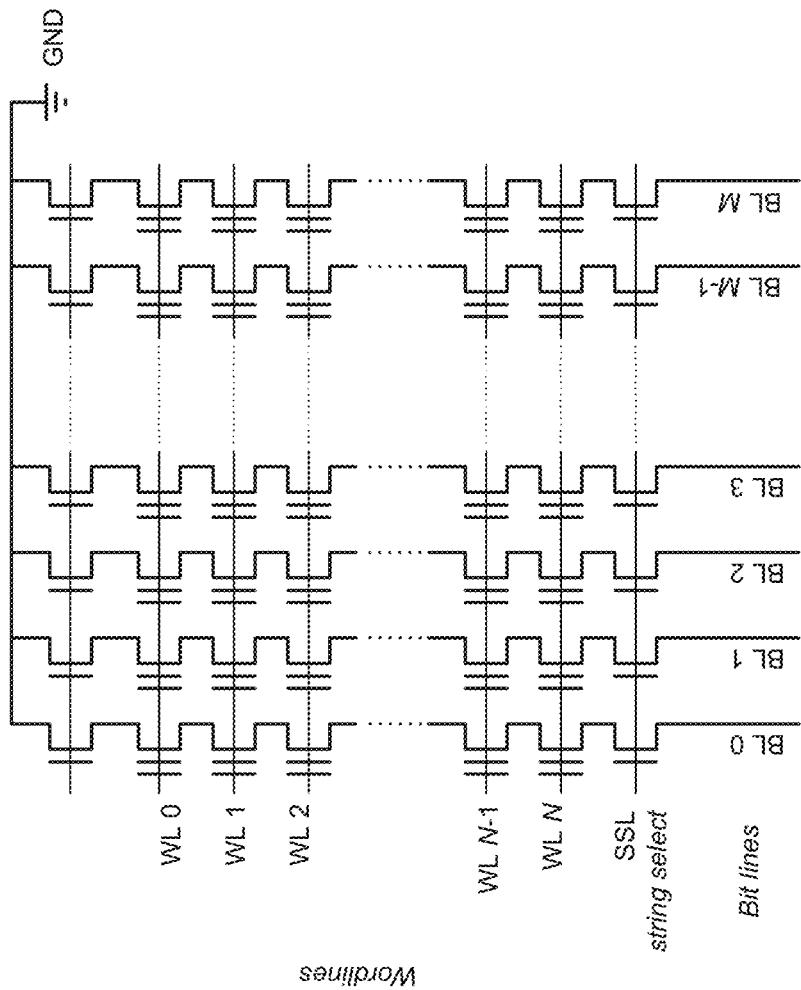
FIG. 2 illustrates an example of a memory cell array implemented based on some embodiments of the disclosed technology.

FIG. 2 illustrates an example of a memory cell array implemented based on some embodiments of the disclosed technology.

In some implementations, the memory cell array can include a NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

One of the key contributors to NAND flash memory reduced reliability is a read disturb, where a read to one row of cells impacts the threshold voltages of unread flash cells in neighboring rows of the same block. Such disturbances lead to an uncorrectable error correction code (UECC) error after a certain amount of host reads from the same SSD hot zone. To eliminate this effect, data can be moved from an affected block of hot zone to a new location. In some implementations, this operation can be referred to as a "refresh" operation that moves, by a flash translation layer (FTL), data from NAND block to a new location and resets read counters (RC) to avoid UECC errors. When a read counter (RC) of the block reaches a read refresher threshold (RRT), then the corresponding refresh operation is queued in a read refresher queue (RRQ) (e.g., queued in a register) immediately and FTL starts moving the corresponding block to a new place (See FIG. 3). However, the process of internal block moving affects the solid state drives (SSD) performance negatively. For example, the SSD performance can drop due to the internal block moving by more than 5%, which is unacceptable for read intensive drives. In addition, a large hot zone under a read disturb (e.g., hot zone including multiple blocks) may lead to an overflow of the available read refresher queue when many blocks reach the read disturb threshold simultaneously and require FTL to find a balance between performance and reliability. In some implementations, a performance drop of more than 5% is not tolerated, and an overflow of RRQ is prevented in order to move all blocks in time and avoid UECC errors.

The disclosed technology can be implemented in some embodiments to provide an algorithm of throttling of block refreshing. In some embodiments, the algorithm of throttling of block refreshing may include an algorithm of mover throttling that does not let more than 5% performance drop. In some embodiments, the algorithm of throttling of block refreshing may include an algorithm of read refresher threshold adjusting that prevents an overflowing of RRQ in order to move all blocks in time and avoid UECC.

Figure 3:
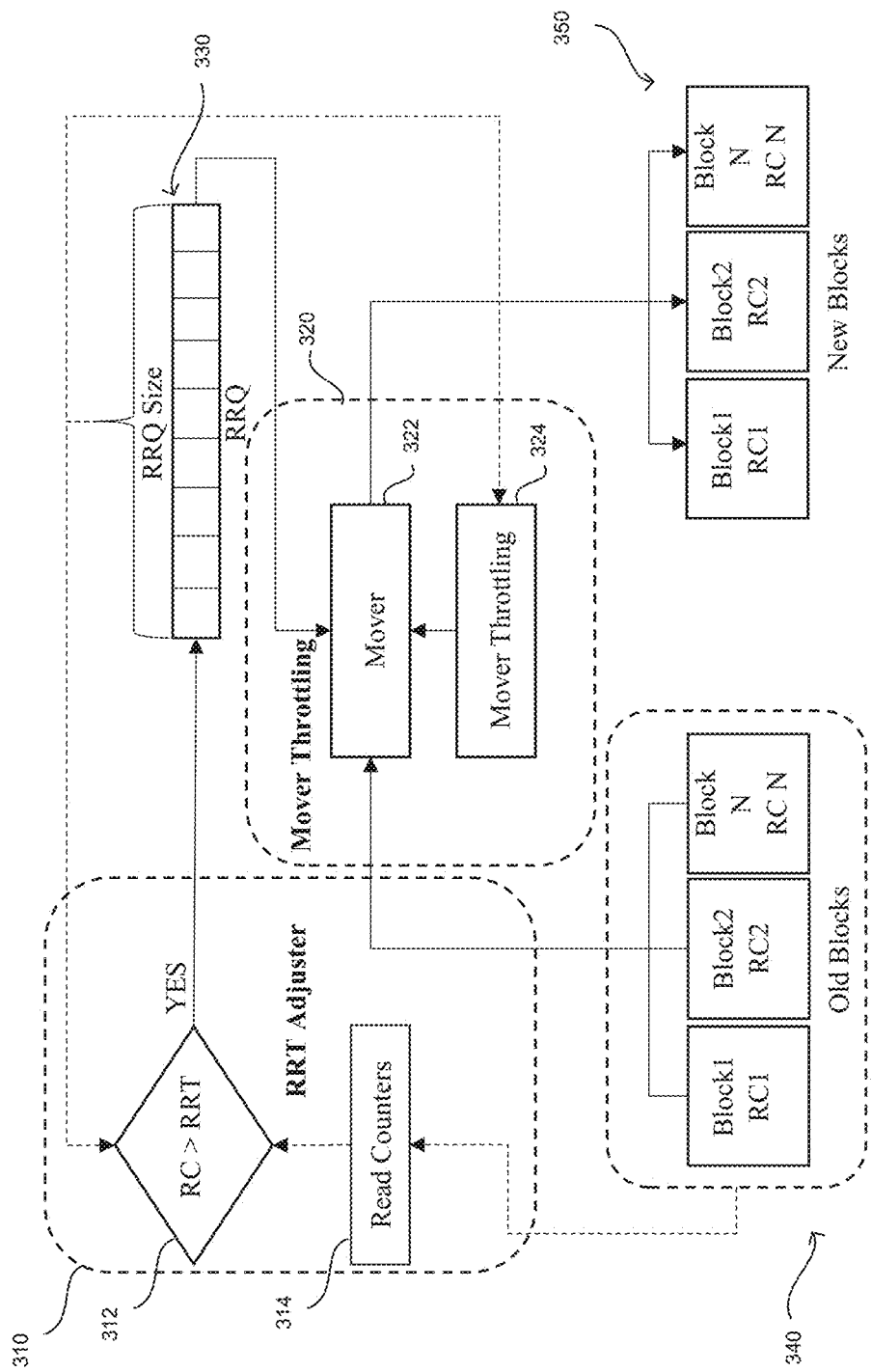
FIG. 3 illustrates an example of read refresher scheme based on some embodiments of the disclosed technology.

FIG. 3 illustrates an example of read refresher scheme based on some embodiments of the disclosed technology.

Referring to FIG. 3, a read refresher scheme may include a read refresher threshold (RRT) adjuster unit 310 and a mover throttling unit 320. In some implementations, the RRT adjuster unit 310 may include a comparator 312 and a read counter 314. In one example, a read counter 314 increases a read counter (RC) value of a block at each read operation, and the comparator 312 compares the RC value with a read refresher threshold (RRT). When the RC value of the block reaches the RRT, then the corresponding refresh operation is queued in a read refresher queue (RRQ) (e.g., register), and the corresponding block (e.g., old blocks 340) is moved to a new place (e.g., new blocks 350).

In some implementations, the mover throttling unit 320 may include a mover circuit 322 configured to move the corresponding block to the new place, and a mover throttling circuit 324 configured to control or adjust the speed of the block moving process. In one example, the mover throttling circuit 324 can slow down the process of block moving by throttling mover read operations.

Referring to FIG. 3, a throttling algorithm of block refreshing based on some embodiments of the disclosed technology includes a mover throttling algorithm and an RRT adjuster algorithm working together in the read refresher subsystem.

In some embodiments, the mover throttling algorithm can be implemented to reduce the impact of block moving on the host read performance by slowing down the process of block moving. In one example, the mover throttling algorithm can slow down the process of block moving by throttling mover read operations. Throttling algorithm keeps a proportion between moving read commands and host read commands, which depends on a predefined RRT and the number of blocks in RRQ. In addition, the maximal possible number of host read commands between moving read commands (denoted by x below) must prevent RRT exceeding.

Let's denote the RRT for a closed block as Le and the RRT for an open block as $L^o$, where $L^o \ll L^c$. The throttling process begins early before $L^c$ by a margin of a reads. Real firmware (FW) groups physical blocks into a super block (SB) for managing and performance purposes. Assume that an SB has B=ndp physical pages, where d is the number of dies, p is the number of planes per die and a physical block has n physical pages. Considering a random read workload with the host command size equals physical page size. Suppose that there are K SBs under the host workload. All K SBs reach the RRT approximately at the same time, and there are K SBs that come to refresh almost simultaneously. The moving read commands (x) can be expressed as:

$$x = 2K * \min\left\{\frac{L^o dp}{nd-1}, \frac{adp-B}{(2K-1)nd-1}\right\} \approx \frac{2pK}{n} * \min\left\{L^o, \frac{a}{2K-1}\right\}$$

In some embodiments, the RRT adjuster algorithm adjusts a value of the read refresher threshold (RRT) according to the number of blocks that are already in RRQ.

In some implementations, the RRT adjuster algorithm can use a linear dependency between the read refresher threshold and the number of blocks in the RRQ:

RRT$_n$=RRT$_{max}$−m*n where RRT$_n$ indicates a read refresher threshold (RRT) for RRQ size n, RRT$_{max}$ indicates the maximum read refresher threshold (RRT), m indicates a read refresher start margin (e.g., time needed to move one block) measured in RC, and n indicates an RRQ size.

If the read refresher threshold (RRT) has a small value (e.g., if the read refresher threshold decreases too fast to a minimal possible value), it may cause blocks to get into RRQ too early. In addition, when a throttling is enabled, it speeds up the process of adding new blocks in RRQ, and the speed of block moving decreases (and the time it takes to move blocks increases). As a result, RRQ overflowing and unnecessary/unwanted block moving may occur, and thus a premature degradation of NAND may occur.

The disclosed technology can be implemented in some embodiments to determine an optimal RRT value based on the number of blocks that are already in RRQ. In the context of this patent document, the words optimal, optimized or optimum that are used in conjunction with RRT values are used to indicate values that provide a better performance for the memory device (e.g., higher reliability, fewer detected errors, etc.) than other threshold values. In this sense, the words optimal may or may not convey the best possible performance achievable by the memory device.

In case multiple blocks appear in RRQ, it can be said that host reads are distributed between all these blocks (i.e., read hot zone includes all these blocks). Therefore, it is not necessary to quickly decrease RRT for the next block due to the expanding of host reading hot zone with constant bandwidth of host interface. As a result, the average number of reads decreases from each block. In this case, an optimal RRT is selected using a harmonic series (1/n):

$$H_n = \ln n + \gamma + \frac{1}{2n}$$

where ln indicates a natural logarithm, γ indicates Euler-Mascheroni constant (≈0.577), and n indicates a series index.

This formula uses natural logarithm that is not efficient from the point of integer arithmetic. The solution uses a simple loop to calculate RRT based on a harmonic number (partial sum):

$$H_n = \sum_{k=1}^{n} \frac{1}{k}$$

Figure 4:
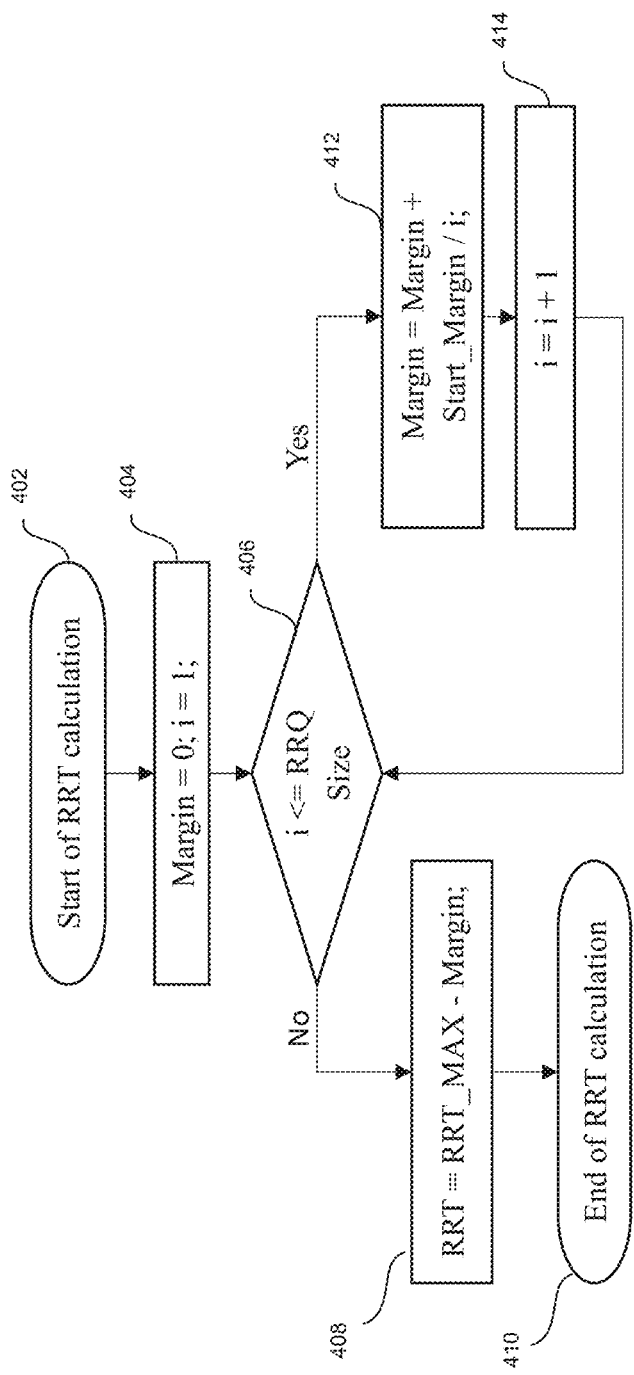
FIG. 4 shows an example of a read refresher threshold (RRT) calculation method based on a harmonic series.

FIG. 4 shows an example of a read refresher threshold (RRT) calculation method based on a harmonic series.

Referring to FIG. 4, at 404, "Margin" is 0 and "i" is 1. Here, "Margin" indicates a margin to complete block moving operation before the read disturb threshold for RRQ size n, and "i" indicates a harmonic series index. The RRT calculation method, at 406, determines whether "i" is smaller than or equal to the size of a read refresher queue (RRQ) ("Yes") or is larger than the size of the RRQ. If "i" is larger than the size of the RRQ ("No"). If "i" is larger than the size of the RRQ. If "i" is larger than the size of the RRQ ("No"), at 408, RRT is determined as RRT_MAX−Margin, and if "i" is smaller than or equal to the size of a read refresher queue (RRQ) ("Yes"), at 412, Margin is determined as Margin+Start_Margin/i. At 414, "i" increases by one and, at 406, whether the increased "i" is smaller than or equal to the size of RRQ or is larger than the size of the RRQ is determined. In some implementations, "Start_Margin" indicates a margin to complete block moving operation before the read disturb threshold.

Figure 5A:
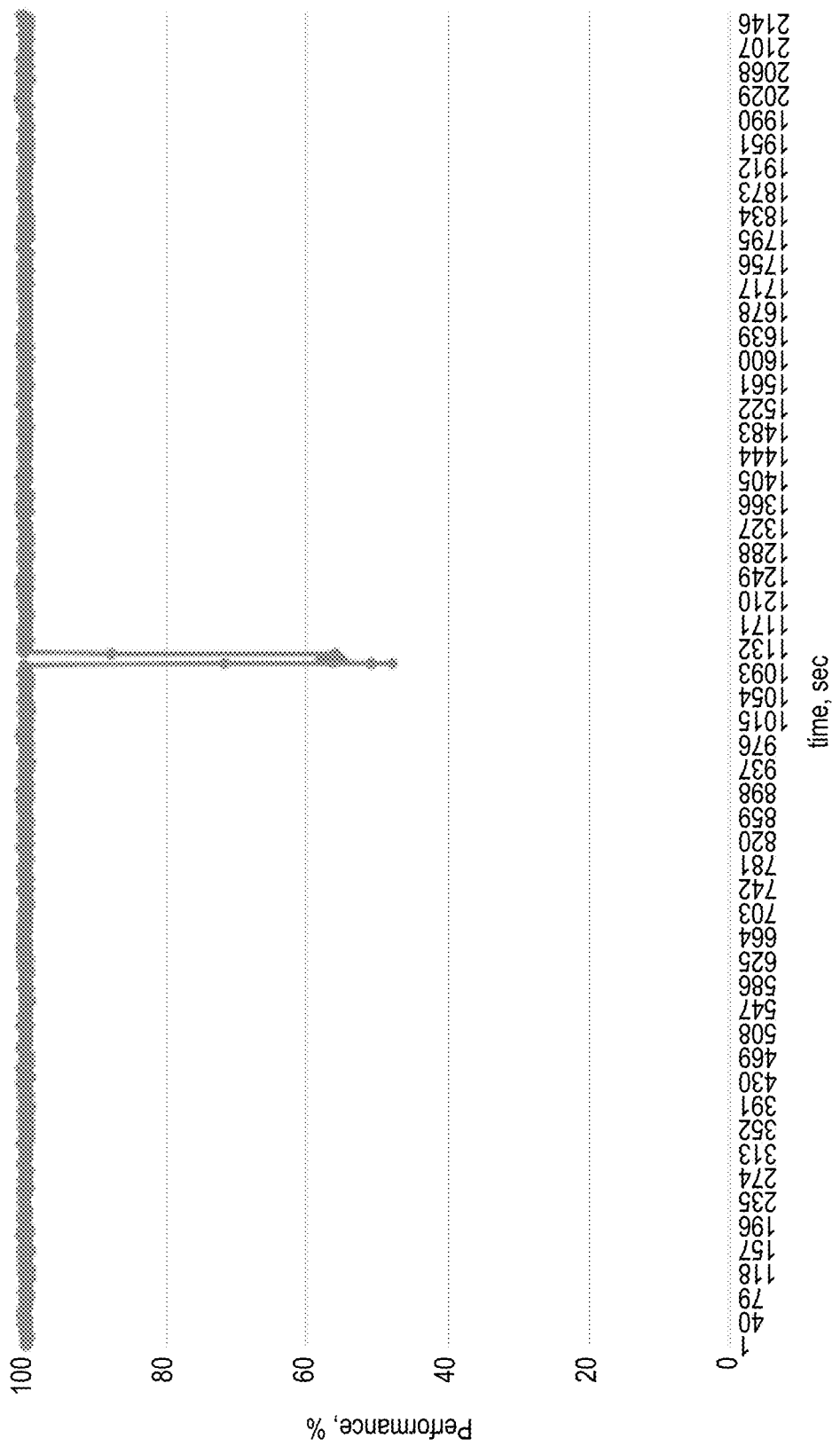
FIG. 5A shows a host read performance with one read refresher event.
Figure 5B:
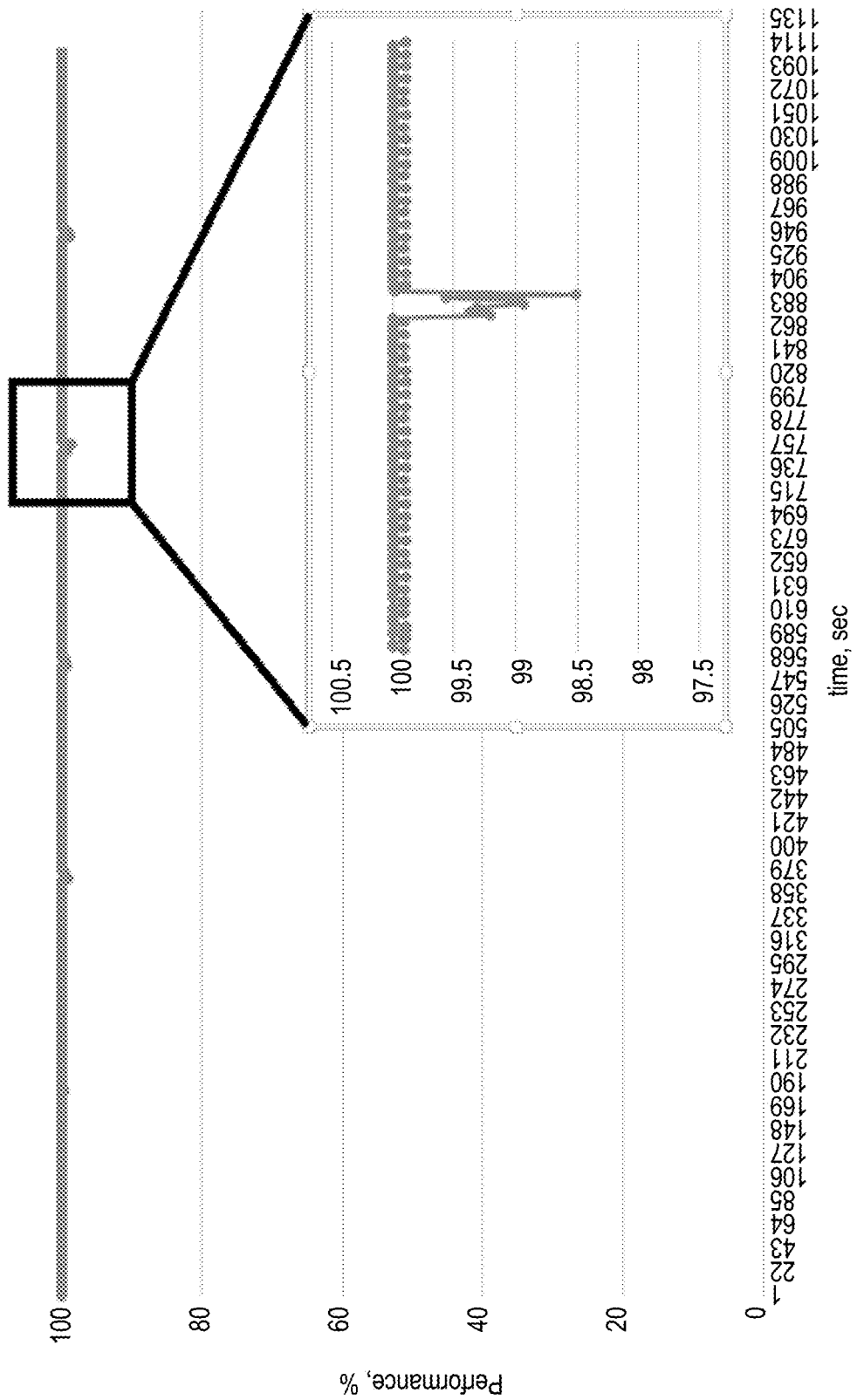
FIG. 5B shows a host read performance with multiple read refresher events based on some embodiments of the disclosed technology.

FIGS. 5A and 5B show examples of host read performance. Specifically, FIG. 5A shows a host read performance with one read refresher event, and FIG. 5B shows a host read performance with multiple read refresher events based on some embodiments of the disclosed technology.

FIG. 5A shows performance measurements that are obtained without applying the read refresher scheme based on some embodiments of the disclosed technology. FIG. 5A shows a significant (more than 50%) host read performance drop during refresher block moving, compared to FIG. 5B.

FIG. 5B shows host read performance measurements that are obtained by the read refresher scheme based on some embodiments of the disclosed technology. The mover throttling algorithm can significantly decrease the performance drop from 50% to 2%. By tuning mover throttling parameters, some embodiments of the disclosed technology can adjust the performance drop in a certain range to achieve the best balance between the host performance drop and RRT value.

Figure 6:
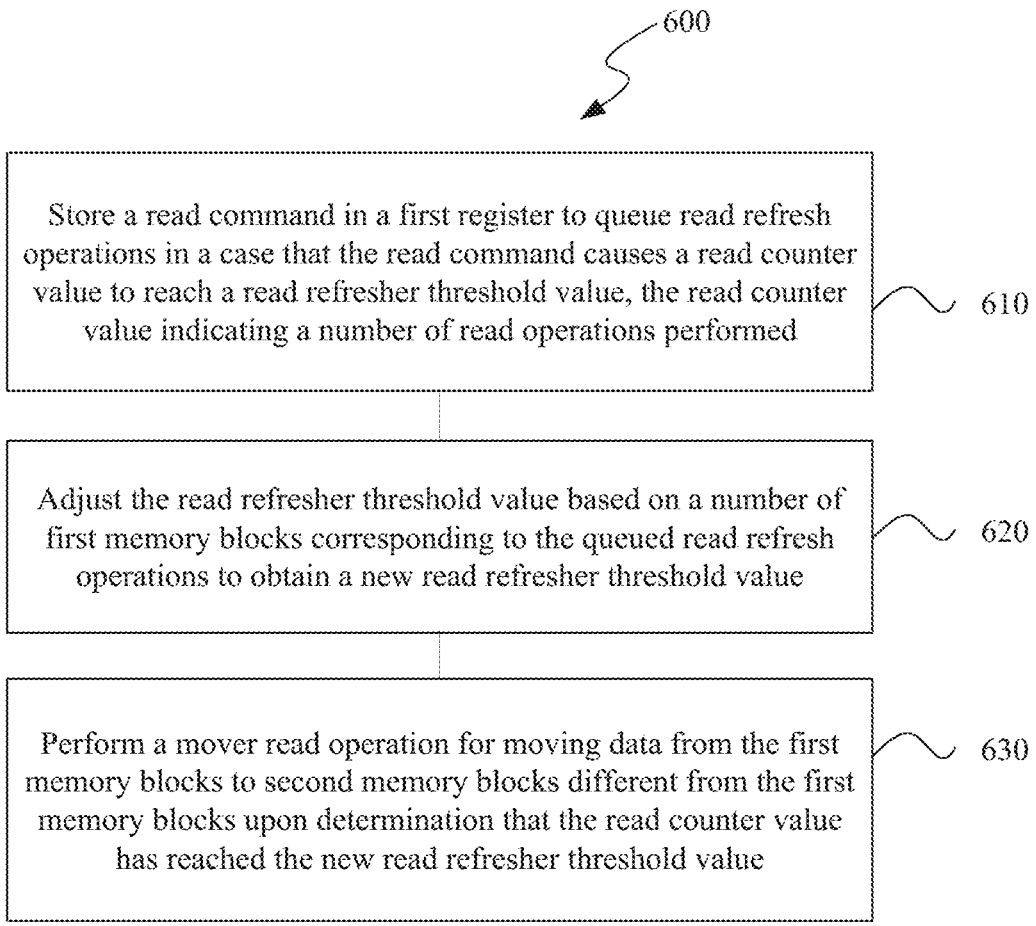
FIG. 6 is a flow diagram that illustrates an example throttling method of block refreshing 600 based on some embodiments of the disclosed technology.

FIG. 6 is a flow diagram that illustrates an example throttling method of block refreshing 600 based on some embodiments of the disclosed technology.

In some implementations, the method 600 includes, at 610, storing a read command in a first register to queue read refresh operations in a case that the read command causes a read counter value to reach a read refresher threshold value, the read counter value indicating a number of read operations performed, at 620, adjusting the read refresher threshold value based on a number of first memory blocks corresponding to the queued read refresh operations to obtain a new read refresher threshold value, and, at 630, performing a mover read operation for moving data from the first memory blocks to second memory blocks different from the first memory blocks upon determination that the read counter value has reached the new read refresher threshold value.

In some implementations, the method 600 further includes performing a mover throttling operation to adjust a speed of the mover read operation to maintain a first proportion between the mover read commands and the host read commands. In some implementations, the method 600 further includes counting a number of read operations to generate the read counter value, and comparing the read counter value with the new read refresher threshold value to determine whether to store the read command in the first register.

Figure 7:
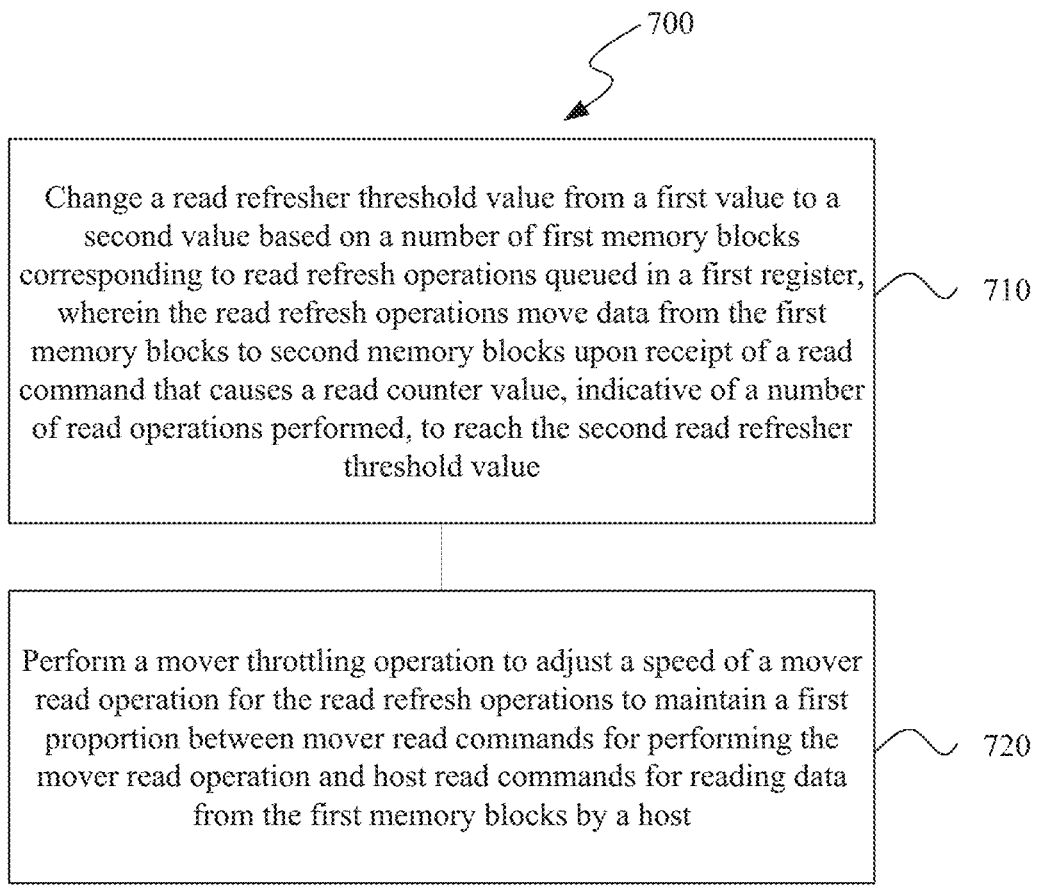
FIG. 7 is a flow diagram that illustrates another example throttling method of block refreshing 700 based on some embodiments of the disclosed technology.

FIG. 7 is a flow diagram that illustrates another example throttling method of block refreshing 700 based on some embodiments of the disclosed technology.

The method 700 includes, at 710, changing a read refresher threshold value from a first value to a second value based on a number of first memory blocks corresponding to read refresh operations queued in a first register, wherein the read refresh operations move data from the first memory blocks to second memory blocks upon receipt of a read command that causes a read counter value, indicative of a number of read operations performed, to reach the second read refresher threshold value, and at 720, performing a mover throttling operation to adjust a speed of a mover read operation for the read refresh operations to maintain a first proportion between mover read commands for performing the mover read operation and host read commands for reading data from the first memory blocks by a host.

Therefore, various implementations of features of the disclosed technology can be made based on the above disclosure, including the examples listed below.

Example 1. A block refreshing method, comprising: storing a read command in a first register to queue read refresh operations in a case that the read command causes a read counter value to reach a read refresher threshold value, the read counter value indicating a number of read operations performed, adjusting the read refresher threshold value based on a number of first memory blocks corresponding to the queued read refresh operations to obtain a new read refresher threshold value, and performing a mover read operation for moving data from the first memory blocks to second memory blocks different from the first memory blocks upon determination that the read counter value has reached the new read refresher threshold value.

Example 2. The method of example 1, wherein the read command includes mover read commands for performing the mover read operation and host read commands for reading data from the first memory blocks by a host.

Example 3. The method of example 2, further comprising performing a mover throttling operation to adjust a speed of the mover read operation to maintain a first proportion between the mover read commands and the host read commands.

Example 4. The method of example 3, wherein the first proportion is determined based on a predefined read refresher threshold value and the number of first memory blocks corresponding to the queued read refresh operations.

Example 5. The method of example 1, further comprising: counting a number of read operations to generate the read counter value, and comparing the read counter value with the new read refresher threshold value to determine whether to store the read command in the first register.

Example 6. The method of example 3, wherein a number of mover read commands corresponding to the mover read operation is expressed as:

$$x = 2K * \min\left\{\frac{L^\circ dp}{nd-1}, \frac{adp-B}{(2K-1)nd-1}\right\} \approx \frac{2pK}{n} * \min\left\{L^\circ, \frac{a}{2K-1}\right\}$$

wherein x indicates the number of mover read commands, $L^\circ$ indicates the read refresher threshold value for an open block, B indicates ndp physical pages in a super block, d indicates a number of dies, p indicates a number of planes per die, n indicates physical pages in a physical block, a indicates a margin of reads by which the mover throttling operation begins before the read refresher threshold value for a closed block, and K indicates a number of super blocks.

Example 7. The method of example 1, wherein the read refresher threshold value is expressed as:

$$RRT_n = RRT_{max} - m*n$$

wherein m indicates a read refresher start margin measured based on the read counter value, and n indicates a size of the first register, $RRT_n$ indicates a read refresher threshold value for the size the first register, and $RRT_{max}$ indicates the maximum read refresher threshold value.

Example 8. The method of example 1, wherein the new read refresher threshold value is determined using a harmonic series.

Example 9. A block refreshing method, comprising: changing a read refresher threshold value from a first value to a second value based on a number of first memory blocks corresponding to read refresh operations queued in a first register, wherein the read refresh operations move data from the first memory blocks to second memory blocks upon receipt of a read command that causes a read counter value, indicative of a number of read operations performed, to reach the second read refresher threshold value, and performing a mover throttling operation to adjust a speed of a mover read operation for the read refresh operations to maintain a first proportion between mover read commands for performing the mover read operation and host read commands for reading data from the first memory blocks by a host.

Example 10. The method of example 9, wherein the first proportion is determined based on a predefined read refresher threshold value and the number of first memory blocks corresponding to the read refresh operations queued in the first register.

Example 11. The method of example 9, wherein the changing of the read refresher threshold value comprises counting a number of read operations to generate the read counter value, and comparing the read counter value with the second read refresher threshold value to determine whether to store the read command in the first register.

Example 12. The method of example 9, wherein the performing of the mover throttling operation comprises moving the data from the first memory block to the second memory block, and adjusting the speed of the mover read operation for the read refresh operations.

Example 13. A system for block refreshing, comprising: a first register configured to store mover read commands for moving data from a first memory block to a second memory block different from the first memory block, a read refresher threshold adjuster in communication with the first register and configured to adjust a read refresher threshold value from a first value to a second value and queue read refresh operations in the first register in a case that a read counter value indicating a number of read operations performed reaches the second read refresher threshold value, and a mover throttling circuit coupled between the first memory block and the second memory block to move data from the first memory block to the second memory block based on the mover read commands stored in the first register.

Example 14. The system of example 13, wherein the read refresher threshold adjuster comprises: a read counter configured to count a number of read operations to generate the read counter value; and a comparator coupled to the read counter to compare the read counter value with the second read refresher threshold value.

Example 15. The system of example 13, wherein the mover throttling circuit comprises: a mover coupled between the first memory block and the second memory block to move the data from the first memory block to the second memory block; and a mover throttling unit coupled to the mover to adjust a speed of the moving of the data.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A memory block refreshing method, comprising:
    storing a read command in a first register to queue read refresh operations in a case that the read command causes a read counter value to reach a read refresher threshold value, the read counter value indicating a number of read operations performed;
    adjusting the read refresher threshold value based on a number of first memory blocks corresponding to the queued read refresh operations to obtain a new read refresher threshold value; and
    performing a mover read operation for moving data from the first memory blocks to second memory blocks different from the first memory blocks upon determination that the read counter value has reached the new read refresher threshold value.

2. The method of claim 1, wherein the read command includes mover read commands for performing the mover read operation and host read commands for reading data from the first memory blocks by a host.

3. The method of claim 2, further comprising performing a mover throttling operation to adjust a speed of the mover read operation to maintain a first proportion between the mover read commands and the host read commands.

4. The method of claim 3, wherein the first proportion is determined based on a predefined read refresher threshold value and the number of first memory blocks corresponding to the queued read refresh operations.

5. The method of claim 1, further comprising:
counting a number of read operations to generate the read counter value; and
comparing the read counter value with the new read refresher threshold value to determine whether to store the read command in the first register.

6. The method of claim 3, wherein a number of mover read commands corresponding to the mover read operation is expressed as:

$$x = 2K * \min\left\{\frac{L^o dp}{nd-1}, \frac{adp-B}{(2K-1)nd-1}\right\} \approx \frac{2pK}{n} * \min\left\{L^o, \frac{a}{2K-1}\right\}$$

wherein x indicates the number of mover read commands, $L^o$ indicates the read refresher threshold value for an open block, B indicates ndp physical pages in a super block, d indicates a number of dies, p indicates a number of planes per die, n indicates physical pages in a physical block, a indicates a margin of reads by which the mover throttling operation begins before the read refresher threshold value for a closed block, and K indicates a number of super blocks.

7. The method of claim 1, wherein the read refresher threshold value is expressed as:

$$RRT_n = RRT_{max} - m*n$$

wherein m indicates a read refresher start margin measured based on the read counter value, and n indicates a size of the first register, $RRT_n$ indicates a read refresher threshold value for the size the first register, and $RRT_{max}$ indicates the maximum read refresher threshold value.

8. The method of claim 1, wherein the new read refresher threshold value is determined using a harmonic series.

9. A block refreshing method, comprising:
changing a read refresher threshold value from a first value to a second value based on a number of first memory blocks corresponding to read refresh operations queued in a first register, wherein the read refresh operations move data from the first memory blocks to second memory blocks upon receipt of a read command that causes a read counter value, indicative of a number of read operations performed, to reach the second read refresher threshold value; and performing a mover throttling operation to adjust a speed of a mover read operation for the read refresh operations to maintain a first proportion between mover read commands for performing the mover read operation and host read commands for reading data from the first memory blocks by a host.

10. The method of claim 9, wherein the first proportion is determined based on a predefined read refresher threshold value and the number of first memory blocks corresponding to the read refresh operations queued in the first register.

11. The method of claim 9, wherein the changing of the read refresher threshold value comprises:
counting a number of read operations to generate the read counter value; and
comparing the read counter value with the second read refresher threshold value to determine whether to store the read command in the first register.

12. The method of claim 9, wherein the performing of the mover throttling operation comprises:
moving the data from the first memory block to the second memory block; and
adjusting the speed of the mover read operation for the read refresh operations.

13. A system for block refreshing, comprising:
a first register configured to store mover read commands for moving data from a first memory block to a second memory block different from the first memory block;
a read refresher threshold adjuster in communication with the first register and configured to adjust a read refresher threshold value from a first value to a second value and queue read refresh operations in the first register in a case that a read counter value indicating a number of read operations performed reaches the second read refresher threshold value; and
a mover throttling circuit coupled between the first memory block and the second memory block to move data from the first memory block to the second memory block based on the mover read commands stored in the first register.

14. The system of claim 13, wherein the read refresher threshold adjuster comprises:
a read counter configured to count a number of read operations to generate the read counter value; and
a comparator coupled to the read counter to compare the read counter value with the second read refresher threshold value.

15. The system of claim 13, wherein the mover throttling circuit comprises:
a mover coupled between the first memory block and the second memory block to move the data from the first memory block to the second memory block; and
a mover throttling unit coupled to the mover to adjust a speed of the moving of the data.

* * * * *